May 31, 1955     C. T. HARTMAN     2,709,604
RESILIENT SUPPORT FOR TRAILER TONGUES
Filed July 3, 1952
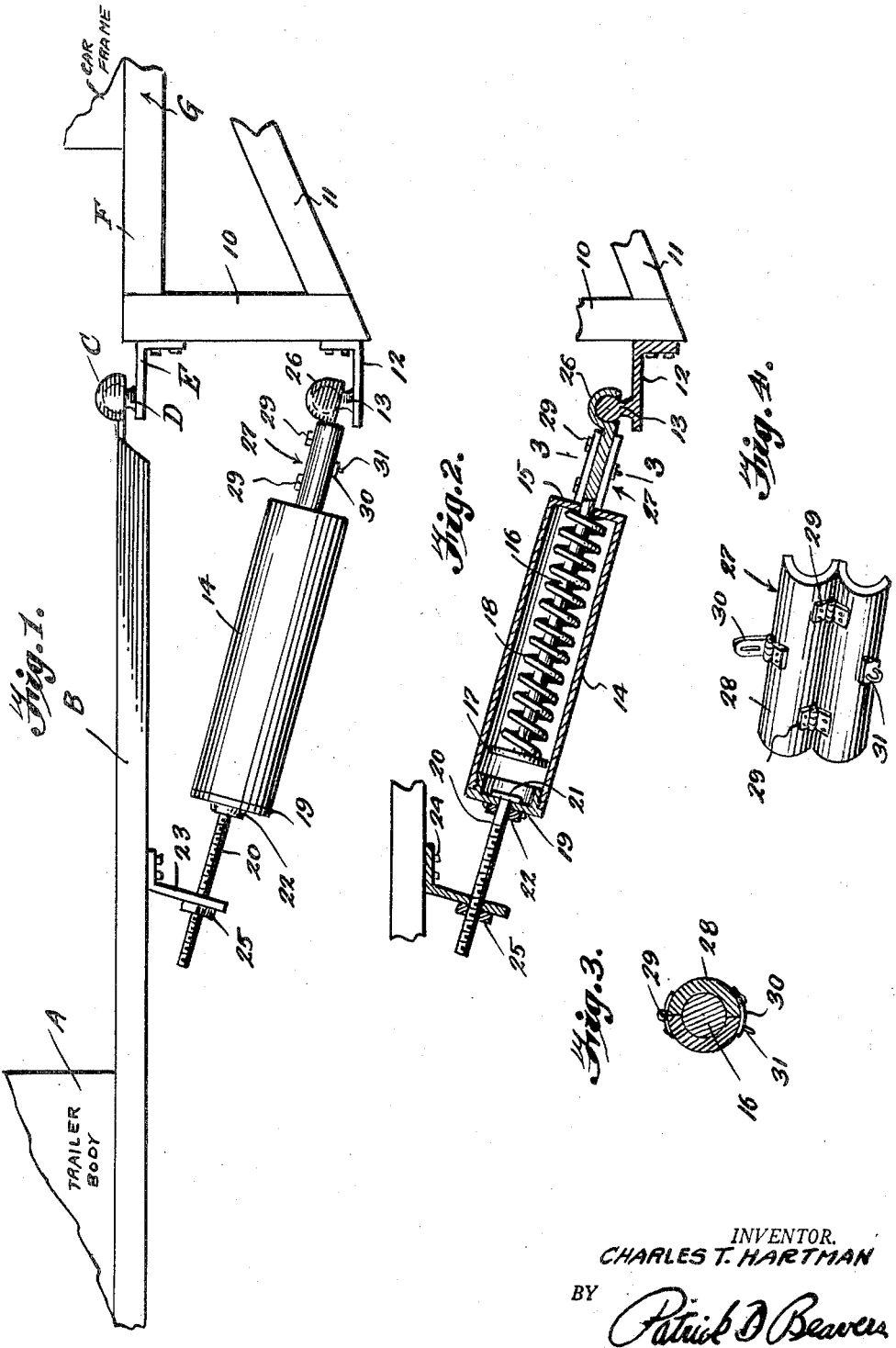
INVENTOR.
CHARLES T. HARTMAN
BY
ATTORNEY

United States Patent Office 2,709,604
Patented May 31, 1955

2,709,604

RESILIENT SUPPORT FOR TRAILER TONGUES

Charles T. Hartman, Boise, Idaho

Application July 3, 1952, Serial No. 297,053

1 Claim. (Cl. 280—406)

The present invention relates to trailer-tractor car hitch appliances.

The principal object of the present invention is to provide a resilient support for the usual trailer tongue which connects to a passenger car or other lead vehicle, to the end that the appliance will serve to relieve considerable load from the rear section of the lead vehicle and helping to transpose this load to the front part of the lead vehicle.

Another important object of the invention is to provide a device of this character which will relieve excessive load on the rear springs and rear end portion of a lead vehicle while at the same time offering a flexibility at the tongue connection and an adjustable factor to take care of ruts and other unevenness of roadways.

Still another object of the invention is to provide a device of the character stated, which is of simple construction, positive acting and not susceptible to the ready development of defects.

Other objects and advantages of the invention will become apparent to the reader of the following description.

In the drawing:

Figure 1 is a fragmentary side elevational view of the appliance in position with respect to a trailer tongue.

Figure 2 is a fragmentary longitudinal sectional view vertically through the appliance.

Figure 3 is cross-section take substantially on line 3—3 of Figure 2.

Figure 4 is a perspective view of the abutment sleeve.

Referring to the drawing wherein like numerals designate like parts, it can be seen that reference character A denotes a trailer body having forwardly extending tongue B. This tongue B has a socket C which engages over a ball D on a bracket E carried by the frame F of a lead vehicle generally referred to by letter G. The frame F is provided with a depending bar 10, braced by bar 11 and in carrying out the present invention, the lower portion of this bar 10 has a bracket 12 on which is a ball 13 and the ball 13 should be exactly plumbed with the axis of the ball D for the best results.

The present invention further consists of a cylinder 14 through the end 15 of which a rod 16 is slidable and this rod at its inner end is provided with a guide head 17. On the rod 16 is a coiled compression spring 18, one end of which impinges against the head 17 while its other end engages the end 15 of the cylinder 14.

The other end of the cylinder 14 is internally threaded to receive a header 19. Numeral 20 denotes an elongated threaded member which has a head 21. This threaded member 20 is disposed through an opening in the header 19 and the threaded member may be welded solidly as at 22 to the header 19.

The threaded portion of the threaded member 20 is disposed through a lug 23 which is attached as at 24 to the under side of the tongue B and this threaded member 20 has an adjusting nut 25 thereon engaging the lug 23 as is shown in Figure 2.

Interposed between the end 15 and the cylinder 14 and a socket 26 at the lower end of the rod 16 is an a butment sleeve generally referred to by numeral 27 and this consists of a pair of semi-cylindrical members 28, hinged together as at 29. A hasp structure 30, 31 may be employed or suitable means for holding these sections 28 together around the lower portion of the rod 16 so as to provide an abutment for the cylinder 14 when unhooking.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

In combination with a trailer having a forwardly projecting tongue, a lead vehicle, a first ball and socket connector interconnecting the tongue and the lead vehicle, said lead vehicle having a sub-frame and an an inclined resilient supporting appliance interposed between the sub-frame and a medial portion of the tongue, said appliance consisting of a barrel, an adjustable connection between one end of the barrel and the tongue, a rod slidable through the other end of the barrel and provided with a head at the inner end thereof, a compression spring between the last mentioned end of the barrel and said head and being convoluted on the rod, and a second ball and socket connector interconnecting said rod and said sub-frame, said ball and socket connectors being in vertical alignment, and an abutment unit for disposition on the rod between the forward end of the barrel and the second connector when unlocking, said abutment unit consisting of a split sleeve.

References Cited in the file of this patent

UNITED STATES PATENTS

| | | |
|---|---|---|
| 2,493,874 | Hume | Jan. 10, 1950 |
| 2,519,564 | Hagg | Aug. 22, 1950 |
| 2,546,206 | Arehart | Mar. 27, 1951 |
| 2,597,657 | Mathisen | May 20, 1952 |
| 2,643,891 | Mosley | June 30, 1953 |

FOREIGN PATENTS

| | | |
|---|---|---|
| 188,308 | Great Britain | Aug. 30, 1923 |